Nov. 25, 1952     S. B. SPRACKLEN     2,619,409
APPARATUS FOR MEASURING THE COMBUSTILE CONTENT OF A GAS
Filed July 29, 1948     2 SHEETS—SHEET 1
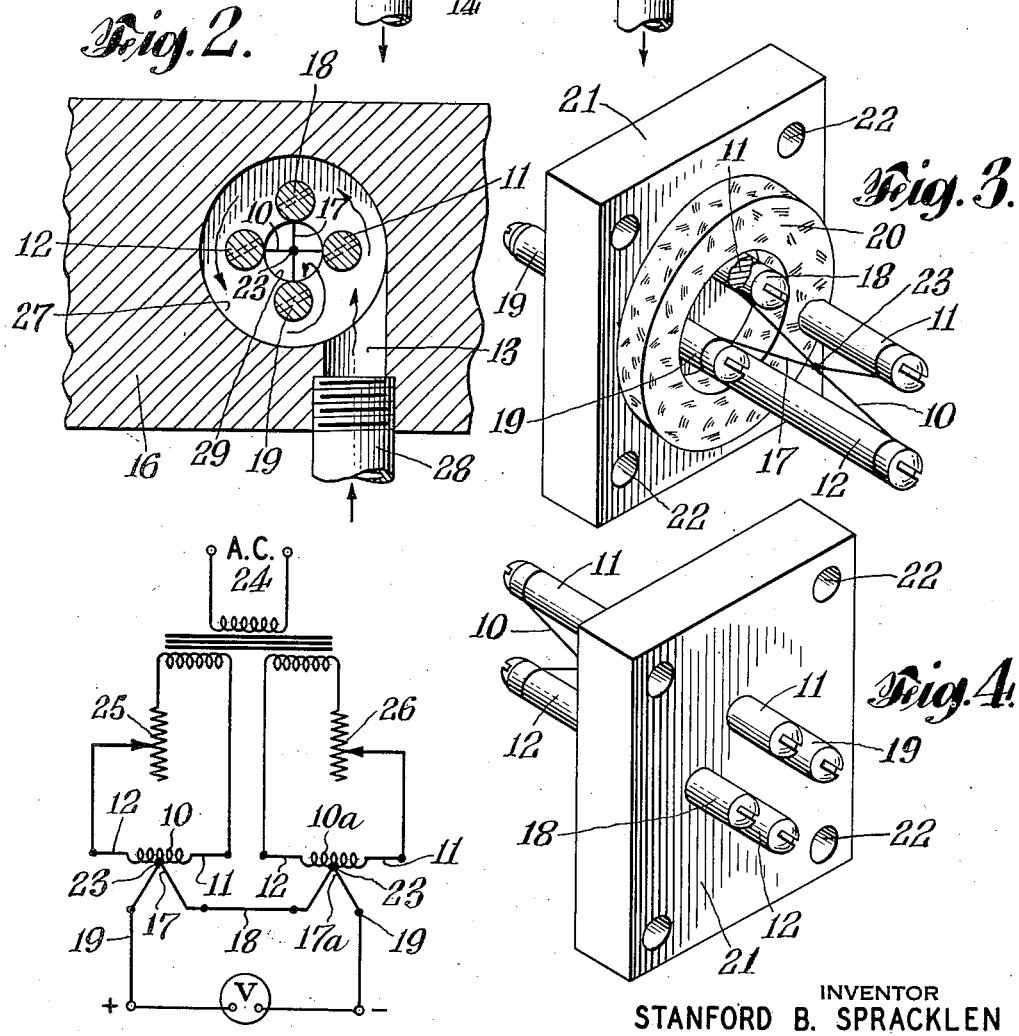
INVENTOR
STANFORD B. SPRACKLEN
BY
D. C. Harrison
ATTORNEY

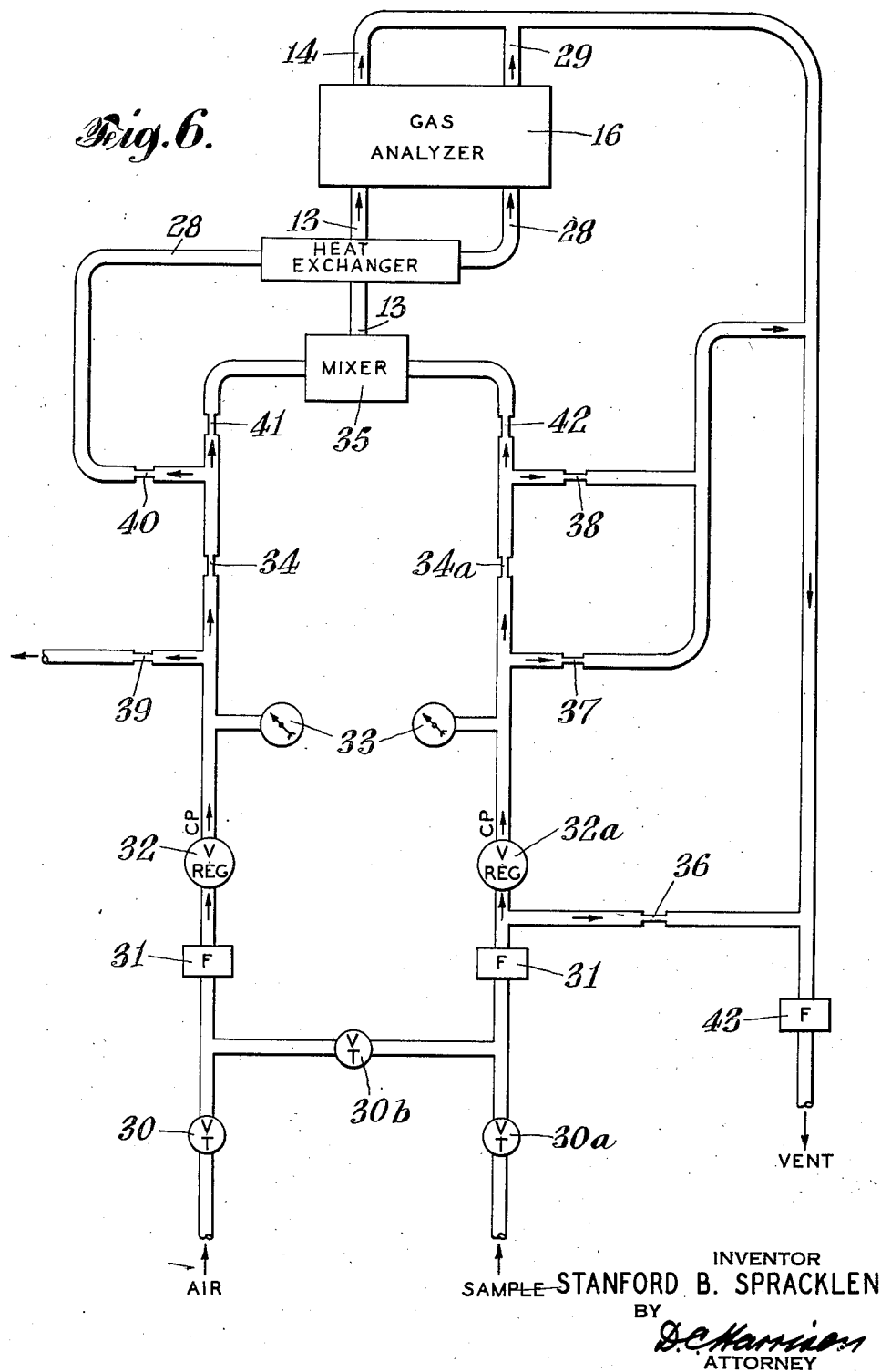

Patented Nov. 25, 1952

2,619,409

UNITED STATES PATENT OFFICE 2,619,409

APPARATUS FOR MEASURING THE COMBUSTIBLE CONTENT OF A GAS

Stanford B. Spracklen, St. Albans, W. Va., assignor, by mesne assignments, to Union Carbide and Carbon Corporation, a corporation of New York Application July 29, 1948, Serial No. 41,335

17 Claims. (Cl. 23—255)

A common way to indicate the combustible content of a mixture of combustible and oxidizing gases has been by a heated non-oxidizable catalyst metal filament having at least the ignition temperature of the mixture. An increase in the temperature of such a filament occurs, which is proportional to the amount of combustible in the mixture. The catalyst filament has been placed in an arm of a Wheatstone bridge when the increase in temperature due to the combustible in the gas has been indicated by measuring the change in electrical resistance of the filament.

This invention relates to an apparatus for indicating the percentage of combustible component in a gaseous mixture and has for an object to reduce drift, an error usually due to evaporation of a heated filamentary catalyst. Another object is to reduce the necessity for frequent calibration of the apparatus used for such indications. Still another object is to provide an apparatus for indicating the combustible content of a gas which gives results that are independent of a variation in voltage applied to a catalyst filament for heating it to the ignition temperature of the mixture and also independent of changes in air temperature.

One difficulty with the prior practice has been that slight evaporation of the catalyst under the temperatures encountered causes a change in resistance of the filament necessitating frequent calibration sometimes as often as every few hours. Another disadvantage is that a direct current source has been usually required for the conventional indicating instruments used with such a bridge. In an analyzer operating 24 hours a day a direct current source may be difficult from the standpoint of cost, space and stability requirements. Also the calibration of an instrument to indicate a combustible gas content is non-linear when measuring with a Wheatstone bridge. If a temperature indicating apparatus is spaced from the catalyst filament by only a very small air gap such as has been found to have so steep a temperature gradient as to make the temperature indications unreliable. There seems to have been some reluctance to make a direct contact between the catalyst filament and any thermally conductive temperature indicating apparatus possibly in the belief that heat conducted from the filament would create too great a source of error.

According to this invention these long standing difficulties have been eliminated by indicating the temperature of the catalyst filament directly without noticeable loss in heat from the filament. This has been accomplished by means of a thermocouple of about the same diameter as the filament and in direct physical contact therewith at a thermally conductive joint preferably by being spot welded thereto. Greater accuracy has resulted and less frequency of calibration has been necessary, the drift being reduced to 2% to 5% of its former size. By the drift is meant a change in the output of the indicating element in a fixed direction for a given period of time. As heretofore stated such drift has been principally caused by evaporation of the catalyst filament at elevated temperatures.

To lessen the likelihood of error by change in the heating of the filament up to the ignition temperature of the gas, and to reduce any error due to changes between temperature of the air and gas being examined, the temperature of the air and gas being analyzed are both substantially equalized and a second filament similar to the first is enclosed in air or other non-combustible gas and heated by a separate impressed voltage which is identical with that impressed on the first filament. A similar thermocouple is connected in the same manner to the second filament but arranged to have its voltage oppose that of the first thermocouple. In this way any change in temperature of the filament due to its impressed voltage introduces no error because output of both thermocouples is responsive only to the additional heating of the first filament due to the combustible gas being analyzed. The thermocouples have been of about the same size as the filament with the result that thermal conductivity from the filament is so small that no heat has been perceptible in the thermocouples a small fraction of an inch away from their spot welded junction with the filament.

Referring to the drawings:

Fig. 1 is a view partly in section of the gas analyzer block of this invention;

Fig. 2 is a section on the line 2—2 of Fig. 1;

Fig. 3 is a perspective showing the cover of the left chamber in Fig. 1;

Fig. 4 is another perspective of the same cover shown in Fig. 3 but looking at the opposite side;

Fig. 5 is a wiring diagram illustrating the preferred embodiment of this invention and showing two catalyst filaments and two thermocouples;

Fig. 6 is a flow diagram of the air and gas in the present invention.

The catalyst filament 10, usually of platinum, is of about 34 gauge in size and mounted in the V shape illustrated in Fig. 1 by having it secured to the supporting and current conducting posts 11 and 12. The gas whose combustible content is to be measured is supplied through the inlet passage 13 to the cylindrical chamber 15 in the block 16 of metal or other suitable material. As shown in Fig. 2 the gas inlet passage is tangential to produce a whirling action of the gas within the chamber 15 for uniformity in mixing. After the gas to be tested has served its purpose of heating the filament 10 by being whirled around it, it is moved through the axial gas outlet passage 14 in the bottom of the block in Fig. 1.

Instead of having the catalyst filament 10 connected in the arm of a Wheatstone bridge as has heretofore been customary, it has been discovered that more accurate results may be obtained by indicating the temperature of the filament 10 directly instead of measuring its resistance change. To accomplish this a thermocouple 17 is connected directly to the filament 10 and mounted between the supporting and binding posts 18 and 19 as shown in Fig. 3, the thermocouple also being mounted in generally V shape since its supporting posts are between those for the catalyst filament. A gasket 20 seals the cover 21 over the chamber 15 against leakage of any gas, the cover being held in place by appropriate bolts through the holes 22. A good contact i. e., one which is thermally conductive between the thermocouple and the filament is insured by a small spot weld 23 at their junction in the vertex of each V.

In the preferred embodiment illustrated in Figs. 1 and 5 a second catalyst filament 10a of similar size and resistance is connected to receive an identical voltage as the first filament from a common A. C. source 24 through the transformer indicated in Fig. 5. Any slight difference in the rate of evaporation or consumption of the two filaments 10 and 10a may be compensated for by adjustment by either or both of the rheostats 25 and 26 in series with these filaments which are supplied with identical voltages from the secondaries of the transformer. Air or other noncombustible gas at substantially the same temperature as the gas being tested is supplied to the chamber 27. In order to make the cylindrical chambers 15 and 27 interchangeable, the air inlet is through the supply pipe 28 to the chamber 27 and thence out through the axial passage 29.

The bi-metallic arms of the thermocouple 17a are oppositely connected to those of the thermocouple 17 so that heating of the two filaments due to their impressed voltages causes equalization of opposite voltages generated in the two thermocouples, their sum being zero. However, when the filament 10 immersed in the combustible gas becomes heated to a still higher amount due to the combustion of such gas at the filament then the thermocouple 17 gives a higher voltage which is directly proportional to the additional heating to which the filament 10 is subjected by reason of the combustible gas. The output then of the opposed thermocouples has a millivoltage varying with the additional heating of the filament 10 and the percent of combustible in the gas being tested. Any suitable thermocouple elements may be used providing they are non-oxidizing and stable at the temperature encountered. Suitable thermocouples may be selected from the graph on page 307 of the Bureau of Standards Bulletin 170 on Pyrometric Practice dated February 16, 1921. From that information nickel and Chromel are shown to give a good voltage output. The particular Chromel used, in combination with nickel, is that known as Chromel P made by Hoskins Manufacturing Company but the exact content of this Chromel P is unknown. In the embodiment illustrated in Fig. 2 the two nickel arms are connected together, the Chromel P arm of each thermocouple being connected to the terminal indicated.

In order to have the air and the gas being tested at the same temperature and thus minimize any errors due to their temperature difference, these two gases are preferably passed through a suitable heat exchanger before being fed to the analyzer block 16.

In measuring the combustible content of any gas an excess of oxygen is necessary to insure complete combustion. To provide an adequate amount of oxygen, air is mixed with the gas being sampled or tested. The amount of oxygen necessary is determined on a volume basis. For instance, for the combustion of one cubic foot of ethylene, two cubic feet of oxygen will be required, which will, upon combustion, yield two cubic feet of water vapor and two cubic feet of carbon dioxide. Therefore, if the range of instrument is established, the amount of oxygen necessary for complete combustion can be determined. Usually a 50% excess of oxygen is supplied over and above that required for full scale operation of the instrument. To insure that a fixed ratio of sample gas to air is maintained at all times, the manifold shown in Fig. 6 is used. Air and sample gas being tested enter through the valves 30 and 30a, respectively. The interconnecting valve 30b is used to bypass the air to the sample side when the sample valve 30a is closed for zeroing purposes. The filters 31 are of fine enough mesh to remove any dirt or foreign matter that might plug up the capillary system. A bypass resriction 36 is used to speed up the sample flow to the pressure regulator 32a. Two pressure gages 33 indicate the pressure down stream from the regulators 32 and 32a. The gage in the air line has a maximum reading of 5 lbs. per cubic foot, while the gage in the sample gas line has a maximum reading of just half that amount. The orifices 37 and 38 are bypass constrictions to speed up the change of sample at the input to the mixer chamber 35. Orifices 34a and 42 are fixed flow resistances for fixing the rate of sample flow to the mixer. Constriction 39 from the air flow side is an orifice opening into the analyzer enclosing case to act as a positive purge to prevent any back diffusion of explosive gases into the enclosing casing or cabinet for the analyzer. An orifice 40 provides air to the reference cell at a flow equal to the gas flow in the measuring cell. Orifices 34 and 41 are fixed resistances which cooperate with the regulator to control the flow of air into the mixing chamber. The gas is fed from the mixer to the combustion cell of the gas analyzer. All the orifices are made of capillary tubing and therefore no backfire flame can propagate through or beyond any orifice from the point of origin of the flame. The filter 43 also prevents propagation of flame or explosions out of the exhaust. Thus the purpose of the manifold illustrated is to provide a reasonably accurate control of the sample-air proportions, to provide adequate oxygen for combustion, and a high speed of response to changes of the sample gas.

Without this invention it has been customary to calibrate the apparatus for accuracy every few hours because the platinum catalyst filament is known to evaporate slowly at elevated temperatures. In the range of 600° C. to 900° C. in which the filament operates the error due to such evaporation may have been as large as 10% in a week where the apparatus is in continuous use. The catalyst 10 possesses the usual function of lowering the ignition temperature of the mixture of combustible and oxidizing gases being tested. The size of filaments 10 and 10a has been selected as 34 gauge as a compromise between the long life of a large filament and the sensitivity of a small filament. With a 4% combustible content in the gas being measured, a catalyst filament 10 of this size may have an expected life of roughly three or four months. The thermocouples 17 and 17a are each of about 34 gauge metals. If smaller the thermocouple life might be shorter. With the size indicated thermal conductivity through the arms of the thermocouple is so slow that no perceptible heat is found ¼" away from the spot weld. An advantage of the illustrated embodiment of this invention is that the oppositely connected thermocouples compensate for any change in voltage on the filaments 10 and 10a and likewise compensate for any changes in temperature of the air. Tests have shown the apparatus of this invention to possess only 2% to 5% of the drift error of the former practice of having the catalyst filament in the arm of the Wheatstone bridge. Where the Wheatstone bridge method is used in determining the percentage of combustible in a gas, direct current is often required and not available, whereas in the present instance alternating current may be used for heating the filament. The apparatus of this invention is also adapted for use as a tilt indicator due to the conductivity of the thermocouple being greater when it is on top of the catalyst filament than when it is below it. A difference in output of as much as 15 millivolts has been observed between the higher voltage when the thermocouple is above rather than below the catalyst filament. In Fig. 1 the catalyst filament is shown below and the thermocouple above. Being more accurate, far less frequent calibration of the present apparatus is needed in continuous operation. Of course either alternating or direct current may be used for heating the filament and to one skilled in the art when direct current only is available no transformer is to be used. The calibration of the output voltage of the thermocouple versus combustible gas content of the gas being tested is linear. By the term "zero drift" is meant the change in millivoltmeter reading for no combustible content in the gas being tested, when such change is due to vaporization of some of the filament, causing a reduction in its cross sectional area.

What is claimed is:

1. Apparatus for indicating the combustible content of a gas, said apparatus including a pair of chambers of substantially the same size and shape, means for supplying a non-combustible gas into one of said chambers and means for supplying into the other of said chambers a gas to be measured, a pair of filaments of substantially the same resistance arranged one in each chamber, means for passing substantially identical electric heating current through each filament, a thermocouple of the same size and kind in each chamber spot welded to the filament in that chamber, and means for substantially equalizing the temperature of the non-combustible gas and of the gas whose combustible content is to be measured prior to their being supplied to said chambers said thermocouples being connected in opposition whereby the voltage output from the pair of thermocouples is that due only to the increase in temperature of the filament heated by combustion of the gas having its combustible content indicated.

2. Apparatus for indicating the content of combustible gas in a mixture with an oxidizing gas which comprises a catalyst filament, a source of current for electrically heating said filament to at least the catalytic ignition temperature of said mixture, means for contacting said filament and gaseous mixture to increase the temperature of the filament above its temperature due to said current, a thermocouple in welded contact with said filament, and means connected to said thermocouple for indicating the heating of the filament over and above the filament heating due to said current.

3. In an apparatus for indicating the combustible content of a gas, said apparatus including a pair of chambers, means for supplying to one chamber a gas the combustible content of which is to be indicated, an outlet passage for said gas from said chamber, a catalyst filament in each chamber, means for electrically heating each filament, a thermocouple in each chamber in thermally conductive physical contact with the filament and heated thereby, means electrically connecting said thermocouples in opposition, a voltage indicator connected for indicating the algebraic sum of the outputs of said thermocouples, and means for substantially equalizing the voltage outputs of said thermocouples at said voltage indicator prior to supplying gas with a combustible content to be measured to one of said chambers, the combination therewith of the improvement for reducing any error due to temperature change in the gas whose combustible content is to be measured, said improvement including means for supplying a non-combustible gas to that chamber to which the gas having a combustible content is not supplied, an outlet passage for non-combustible gas from its chamber, and means for substantially equalizing the temperatures of the said two gases prior to their being supplied to said chambers.

4. In an apparatus for indicating the combustible content of a gas, said apparatus including a pair of chambers, means for supplying to one chamber a gas the combustible content of which is to be indicated, an outlet passage for said gas from said chamber, a catalyst filament in each chamber, means for electrically heating each filament, a thermocouple in each chamber heated by the filament therein, means electrically connecting said thermocouples in opposition, a voltage indicator connected for indicating the algebraic sum of the outputs of said thermocouples, and means for substantially equalizing the voltage outputs of said thermocouples at said voltage indicator prior to supplying gas with a combustible content to be measured to one of said chambers, the combination therewith of the improvement for enhancing the sensitivity of said apparatus for indicating changes in the combustible content of the gas being tested, said improvement including the thermocouple in each chamber being in molecularly integral contact with the catalyst filament in its chamber.

5. Apparatus according to claim 4 in which said direct contact between the catalyst filament and the thermocouple in each chamber is effected by a spot welded connection therebetween.

6. In an apparatus for indicating the combustible content of a gas, said apparatus including a pair of chambers, means for supplying to one chamber a gas the combustible content of which is to be indicated, an outlet passage for said gas from said chamber, a catalyst filament in each chamber, means for electrically heating each filament, a thermocouple in each chamber heated by the filament therein, means electrically connecting said thermocouples in opposition, a voltage indicator connected for indicating the algebraic sum of the outputs of said thermocouples, and means for substantially equalizing the voltage outputs of said thermocouples at said voltage indicator prior to supplying gas with a combustible content to one of said chambers, the combination therewith of the improvement for reducing any error due to temperature change in the gase whose combustible content is to be measured, and also for enhancing the sensitivity of said apparatus for indicating changes in the combustible content of the gas being tested, said improvements including means for supplying a non-combustible gas to that chamber to which the gas having a combustible content is not supplied, an outlet passage for non-combustible gas from its chamber, means for substantially equalizing the temperatures of the said two gases prior to their being supplied to said chambers, and the thermocouple in each chamber being in welded contact with the catalyst filament in its chamber.

7. In an apparatus for indicating the combustible content of a gas, said apparatus including a pair of chambers, means for supplying to one chamber a gas the combustible content of which is to be indicated, an outlet passage for said gas from said chamber, a catalyst filament in each chamber, means for electrically heating each filament, a thermocouple in each chamber in thermally conductive physical contact with the filament therein and heated thereby, means electrically connecting said thermocouples in opposition, a voltage indicator connected for indicating the algebraic sum of the outputs of said thermocouples, and means for substantially equalizing the voltage outputs of said thermocouples at said voltage indicator prior to supplying gas with a combustible content to one of said chambers, the combination therewith of the improvement for reducing any error due to temperature change in the gas whose combustible content is to be measured, said improvement including means for supplying a non-combustible gas to that chamber to which the gas having a combustible content is not supplied, an outlet passage for non-combustible gas from its chamber, and means for substantially equalizing the temperatures of the said two gases prior to their being supplied to said chambers, each chamber being cylindrical and the gas supplying means for each chamber including a supply passage the axis of which is substantially tangential to said chamber and the outlet passage from each chamber being substantially axially arranged with respect to its chamber.

8. In an apparatus for indicating the combustible content of a gas, said apparatus including a pair of chambers, means for supplying to one chamber a gas the combustible content of which is to be indicated, an outlet passage for said gas from said chamber, a catalyst filament in each chamber, means for electrically heating each filament, a thermocouple in each chamber heated by the filament therein, means electrically connecting said thermocouples in opposition, a voltage indicator connected for indicating the algebraic sum of the outputs of said thermocouples, and means for substantially equalizing the voltage outputs of said thermocouples at said voltage indicator prior to supplying gas with a combustible content to one of said chambers, the combination therewith of the improvement for reducing any error due to temperature change in the gas whose combustible content is to be measured, and also for enhancing the sensitivity of said apparatus for indicating changes in the combustible content of the gas being tested, said improvements including means for supplying a non-combustible gas to that chamber to which the gas having a combustible content is not supplied, an outlet passage for non-combustible gas from its chamber, means for substantially equalizing the temperatures of said two gases prior to their being supplied to said chambers, and the thermocouple in each chamber being in direct contact with the catalyst filament in its chamber, said filament in each chamber being of V shape and the thermocouple in each chamber also being V shape, the vertices of the filament and of the thermocouple in each chamber being in welded contact.

9. In an apparatus for indicating the combustible content of a gas, a pair of chambers, means for supplying to one of said chambers a gas the combustible content of which is to be indicated, a catalyst filament in each chamber, means for electrically heating the catalyst filament in each chamber, a thermocouple in each chamber heated by the catalyst filament therein, means electrically connecting said thermocouples in opposition, a voltage indicator connected for indicating the algebraic sum of the outputs of said thermocouples, means for supplying a non-combustible gas to the other chamber of said pair, a rheostat for the thermocouple in each chamber, a gas outlet passage from each chamber, and the combination therewith of the improvement for enhancing the approach to a straight line relation between the voltage indicator readings and an increase in temperature of the filament in the first mentioned chamber due to combustion, said improvement comprising a welded connection between each filament and its thermocouple whereby each thermocouple is heated to the temperature of its filament at its place of connection.

10. Apparatus according to claim 9 in which the thermocouple in at least the first mentioned chamber is filamentary and spot-welded to its catalyst filament.

11. Apparatus according to claim 9 in which the catalyst filament and its thermocouple in at least the first mentioned chamber are of substantially the same size.

12. Apparatus according to claim 11 in which the catalyst filament and its filamentary thermocouple are each about 34 gauge in size.

13. In an apparatus for indicating the combustible content of a gas, a catalyst filament, means for heating said filament, means for passing said gas across the filament, a filamentary thermocouple in spot-welded contact with said filament, and a voltage indicator for said thermocouple.

14. In an apparatus for measuring the combustible content of a gas, said apparatus including two chambers, a catalyst filament of non-oxidizing material in each chamber, means for supplying to one chamber a mixture of the gas the combustible content of which is to be measured and an oxidizing gas, means for electrically heating each filament, a thermocouple in each chamber responsive to the heating of the filament in that chamber, said heating means including a rheostat in series with each filament for controlling the electrical heating thereof, and an exhaust passage from the chamber to which said gas supplying means is connected, the combination therewith of the improvements for: (a) reducing an error in temperature measurement of the filaments due to a temperature gradient in separation of a thermocouple and filament; (b) for reducing the error due to inequality in filament vaporization; (c) for reducing the local heating of a thermocouple by convection currents of gas from a catalyst filament; and (d) for reducing the danger of any dead pockets of gas around a filament, said improvements comprising: (a) the junction of dissimilar metals of each thermocouple being in thermally conductive contact with its filament in a central portion thereof; (b) the electrical heating means for each filament being of a size to enable each filament to be heated to substantially the same temperature initially and after one filament may have vaporized away more rapidly than the other, means for supplying a non-combustible gas to the chamber other than that to which the combustible gas is supplied, and means for substantially equalizing the temperature of the gas supplied to each chamber; (c) each catalyst filament and its thermocouple being filamentary and of V shape with their vertices in contact and the plane of each V widely displaced angularly from the plane of the V in contact therewith at its vertex; and (d) the gas supply means for each chamber being laterally displaced from a center of the chamber to effect a whirling of the supplied gas within each chamber about the filaments therein.

15. In an apparatus for measuring the combustible content of a gas, said apparatus including a catalyst filament, a chamber enclosing said filament, a passage for supply of gas to said chamber, a discharge passage for gas from said chamber, means for supplying a voltage to said filament while being used to bring said filament to a temperature capable of effecting surface combustion on the filament of some of the combustible content of the gas being tested, and a thermocouple receiving heat from said filament, the combination therewith of the improvement for measuring the heating effect of surface combustion on the filament of the gas being tested with reduction in zero drift and in a manner whereby calibration of the output voltage of the thermocouple due to heating effect of the gas being tested plotted against combustible content of the gas being tested is linear, said improvement including said thermocouple being in direct physical contact with said filament at a thermally conductive joint, and means connected with said thermocouple for indicating the heating effect upon said filament due to surface combustion of the combustible content of said gas being tested.

16. An apparatus according to claim 15 in which said thermally conductive joint is attained by a weld between said thermocouple and filament.

17. Apparatus according to claim 15 in which the thermocouple has arms each of which is of cross-sectional area not substantially larger than that of the catalyst filament to preclude substantial heat leak by conduction from the filament.

STANFORD B. SPRACKLEN.

REFERENCES CITED

The following references are of record in the file of this patent:

UNITED STATES PATENTS

| Number | Name | Date |
| --- | --- | --- |
| 1,381,450 | Butterfield | June 14, 1921 |
| 1,416,361 | Lamb et al. | May 16, 1922 |
| 1,779,569 | Thompson | Oct. 28, 1930 |
| 1,957,341 | Holt | May 1, 1934 |
| 2,049,987 | Willenborg | Aug. 4, 1936 |
| 2,052,181 | Krogh | Aug. 25, 1936 |
| 2,073,349 | Morgan et al. | Mar. 9, 1937 |
| 2,081,094 | Morgan | May 18, 1937 |
| 2,083,520 | Miller | June 8, 1937 |
| 2,083,521 | Miller | June 8, 1937 |
| 2,269,850 | Hebler | Jan. 13, 1942 |
| 2,400,923 | Farr et al. | May 28, 1946 |

FOREIGN PATENTS

| Number | Country | Date |
| --- | --- | --- |
| 238,531 | Great Britain | Sept. 9, 1926 |
| 291,834 | Great Britain | May 22, 1928 |